UNITED STATES PATENT OFFICE.

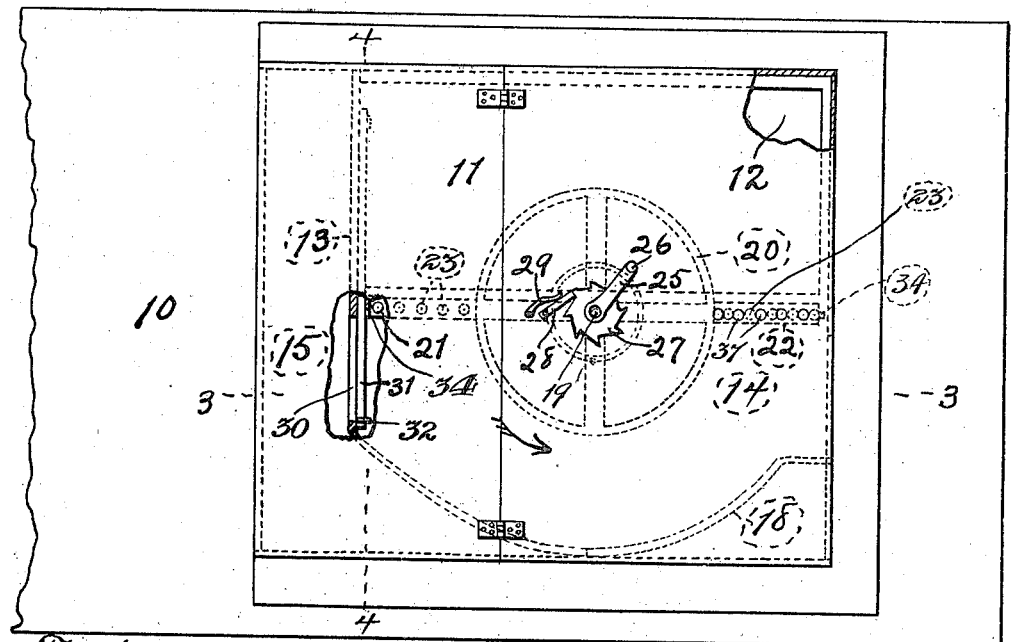

JOSEPH W. MENDENHALL, OF DES MOINES, IOWA.

ANIMAL-TRAP.

983,921.

Specification of Letters Patent. Patented Feb. 14, 1911.

Application filed November 29, 1909. Serial No. 530,365.

*To all whom it may concern:*

Be it known that I, JOSEPH W. MENDENHALL, a citizen of the United States of America, and resident of Des Moines, Polk county, Iowa, have invented a new and useful Animal-Trap, of which the following is a specification.

The object of this invention is to provide an improved construction for animal traps.

A further object of this invention is to provide improved means for automatically setting an animal trap.

My invention consists in the construction, arrangement and combination of elements hereinafter set forth, pointed out in my claims and illustrated by the accompanying drawing, in which—

Figure 1 is a plan of my improved trap, a portion of the cage being broken away to economize space. Fig. 2 is a side elevation of the same. Fig. 3 is a longitudinal section of the trap on the indicated line 3—3 of Fig. 1. Fig. 4 is a cross-section of the trap on the indicated line 4—4 of Fig. 1.

In the construction of the device as shown I employ a cage section 10 of common form. A trap section 11 is mounted on the top of and fixed to the cage section 10 and communicates therewith through an opening 12 in the top of said cage. The trap 11 preferably is in the form of a rectangular box and a transverse partition 13 therein divides said trap into an approximately square compartment 14 and a bait box 15 at one end of said trap. The bait box 15 preferably is formed with openings 16, 17 in its outer walls, and said openings are covered with screen wire of suitable strength. An arc-shaped guide partition 18 is mounted in one side of the compartment 14 and connects at one end with one end of the partition 13, and forms a part of the inner wall of the bait box 15. That portion of the guide partition 18 which forms a part of the wall of the bait box 15 preferably is constructed of screen wire. The arc-shaped partition 18 forms a restricted runway in the trap 11 on the opposite side of the median line thereof from the opening 12 to the cage 10. A vertical shaft 19 is mounted approximately centrally of the compartment 14 and is journaled in bearings in the top and bottom of the trap section 11. The shaft 19 is formed with a hub 20 and horizontal arms 21, 22 are fixed to the middle of said hub on opposite sides thereof and extend diametrically across the compartment 14. A plurality of rake teeth 23 are mounted through each of the arms 21, 22 and extend from top to bottom of the compartment 14. A spring 24 is coiled around the shaft 19 within the hub 20, and the lower end of said spring is fixed to the bottom of the trap 11. The upper end of said spring 24 is fixed to the shaft 19 near the upper end thereof. The upper end of the shaft 19 extends through the top of the trap and is provided with a crank arm 25 outside of said trap. A handle 26 is provided on said crank arm 25, and the shaft 19 is adapted to be rotated by means of said crank arm and handle, in the direction of the arrow in Fig. 1, for the purpose of winding up the spring 24. A ratchet 27 is formed on the upper end of the shaft 19 above the top of the trap, and said ratchet is adapted to be engaged by a pawl 28 mounted on the top of said trap and normally held in engagement with said ratchet by a spring 29. The partition 13 is formed with an opening 30 affording communication between the compartment 14 and bait box 15. A trigger 31 is pivoted at one end within the compartment 14 on the partition 13, and the opposite end of said trigger extends horizontally across the opening 30 and is confined and limited in its vertical arcuate movement by means of pins 32, 33 in the partition 13. The outer end of each horizontal arm 21, 22 is provided with a pin 34 extending longitudinally therefrom, and one or another of said pins 34 is adapted to engage normally with a notch 35 in the trigger 31, and such engagement will restrain the arms 21, 22 and shaft 19 against rotation, under the influence of the power stored in the spring 24, in a direction opposite to the arrow in Fig. 1. An opening or door 36 is provided in the wall of the trap opposite to the partition 13, and affords ingress means to the compartment 14.

In practical use of this device the trap is set in a suitable place and the bait box 15 filled with cheese or other bait. The spring 24 is wound up by releasing the pawl 28 from engagement with the ratchet 27 and rotation of the crank arm 25 in the direction of the arrow in Fig. 1. When a rat or other rodent smells and sees the bait in the bait box 15, through the screened openings 16, 17 in the outer walls thereof, he will naturally seek access thereto. He will discover and enter the opening 36 and his course will be directed, by means of the guide partition 18 and the odor of the bait, toward the opening 30 in the partition 13. In seeking to enter such opening and reach the bait the rat will raise the trigger 31 out of engagement with a pin 34, thus allowing the shaft 19 and arms 21, 22 to revolve in a direction opposite to the arrow in Fig. 1, under the influence of the power stored in the spring 24. One of the arms 21 or 22 and the rake teeth thereon, during such rotation, will strike the animal and sweep him into the opposite side of the compartment 14 and through the opening 12 in the bottom thereof into the cage 10 below. The trigger 31 immediately falls by gravity, and when the shaft 19 and arms 21, 22 have made a half revolution, a pin 34 on the end of one of said arms will again engage with the notch 35 in said trigger and cause such rotation to cease, and the trap is ready for another animal. Thus the parts will always normally stand in the position shown in Fig. 1. After an animal has been carried into the farther side of the compartment 14 by the rotation of the shaft and arms as above described, he is unable to return in the direction he went in because of the fact that said shaft and arms are restrained against reverse rotation by the ratchet 27 and pawl 28. Rake teeth 37 are fixed to the top and bottom of the trap 11 in alinement with the arms when in the position shown, and on the opposite side of the shaft 19 from the opening 30 and trigger 31, and said rake teeth 37 are in staggered relations to the rake teeth 23 on said arms. By this means the animal is prevented from returning at that side of the shaft after being carried into the farther side of the compartment 14. The top or cover of the trap section 11 may be made removable in two or more sections to provide access to the bait box 15, compartment 14, or cage 10 through said compartment 14 and the opening 12 in the bottom thereof.

I claim as my invention—

1. In an animal trap, a cage section, a trap section mounted on said cage and communicating therewith, a bait box in said trap section, a door in said trap section opposite to said bait box, a vertical shaft mounted for rotation in said trap section, horizontal arms on said shaft midway between the top and bottom of the trap; vertical rake teeth extending through said arms, a spring fixed at its upper end in said shaft, coiled around said shaft and fixed at its lower end in the bottom of said cage, a hub on said shaft inclosing said spring, said shaft extending through the top of said trap and provided with a crank arm and handle by means of which said spring may be wound, ratchet and pawl connections to prevent rotation of said shaft in one direction, and a horizontal trigger pivoted at one end to said bait box within said trap, said trigger adapted to engage ends of said horizontal arms and prevent rotation of said shaft in the opposite direction.

2. In a device of the class described, a cage, a trap mounted above said cage, a bait box at one end of said trap, said trap divided longitudinally into two compartments by a revolving partition, said partition composed of a vertical shaft journaled in bearings in the top and bottom of said trap, horizontal arms on said shaft, midway between the top and bottom of this trap; and vertical rake teeth extending through said arms, a door in the first compartment opposite to said bait box, the floor of the second compartment cut away to provide communication with said cage, at one side of the median line of the trap, a guide partition within the trap on the opposite side of the revolving partition from the exit and forming a restricted runway from the door to the bait box, a spring coiled around said shaft and adapted to revolve said partition in one direction, means for winding said spring, means for preventing rotation of said shaft in the opposite direction, a horizontal trigger pivoted at one end to said bait box and located within said trap with its free end at the end of the revolving partition adjacent the bait box, means for limiting movement of said trigger through an arc, and a stop on said trigger for successively engaging the ends of said revolving partition.

Signed by me at Des Moines, Iowa, this 27th day of November, 1909.

JOSEPH W. MENDENHALL.

Witnesses:
S. C. SWEET,
EARL M. SINCLAIR.